United States Patent
Janasek (10) Patent No.: US 10,655,686 B2
(45) Date of Patent: May 19, 2020

(54) CLUTCH PRIMING SYSTEM AND METHOD

(71) Applicant: Deere & Company, Moline, IL (US)

(72) Inventor: Clayton G. Janasek, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 308 days.

(21) Appl. No.: 15/711,200

(22) Filed: Sep. 21, 2017

(65) Prior Publication Data

US 2019/0085908 A1    Mar. 21, 2019

(51) Int. Cl.
| | |
|---|---|
| *F16D 13/64* | (2006.01) |
| *F16D 25/0638* | (2006.01) |
| *F16D 48/02* | (2006.01) |
| *F16D 13/70* | (2006.01) |
| *F16D 13/75* | (2006.01) |

(52) U.S. Cl.
CPC ............. *F16D 13/64* (2013.01); *F16D 13/70* (2013.01); *F16D 13/75* (2013.01); *F16D 25/0638* (2013.01); *F16D 48/02* (2013.01)

(58) Field of Classification Search
CPC ................................. F16H 59/42; F16H 59/36
See application file for complete search history.

(56) References Cited

U.S. PATENT DOCUMENTS 9,169,921 B2 * 10/2015 Byerly ................ F16H 61/0437

FOREIGN PATENT DOCUMENTS

| DE | 19917575 A1 | 10/2000 |
| DE | 102015209477 A1 | 11/2016 |

OTHER PUBLICATIONS

German Search Report for application No. 102018214061 dated May 14, 2019.

* cited by examiner

*Primary Examiner* — Derek D Knight
(74) *Attorney, Agent, or Firm* — Klintworth & Rozenblat IP LLP (57) ABSTRACT

A priming system and method includes an actuator effecting engagement of a frictional element to couple input and output elements to transfer a torque. A control system initiates actuation of the frictional element through the actuator when a speed of the frictional element is below a priming threshold speed. The frictional element is primed to prepare the frictional element to transfer the torque from the input element to the output element, without delivering the torque to the output element. The frictional element in held in the primed state when the speed is below the priming threshold speed. The actuator completes actuation of the frictional element when the speed reaches the shift point, engaging the frictional element to deliver the torque to the output element.

20 Claims, 8 Drawing Sheets

CLUTCH PRIMING SYSTEM AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to clutch systems, and to systems for power transfer applications where a frictional element is used to intermittently transfer torque.

BACKGROUND OF THE DISCLOSURE

Various power transfer applications include frictional elements such as clutches and brakes that are engaged to carry frictional torque when required, and that are disengaged when torque transfer through the frictional element is not required. For example, in a vehicle with a driveline that includes an automatic transmission, frictional elements are engaged and disengaged in different combinations to provide different gear ratios for propelling the vehicle. To provide a gear shift, the transmission changes from one combination of engaged frictional elements to another. Frictional elements are engaged by applying an actuation force or pressure, which may be delivered using a variety of actuator types including hydraulic, pneumatic, electric and mechanical operated actuators.

SUMMARY OF THE DISCLOSURE

The disclosure provides a priming system and method for improved shift performance.

In one aspect, a priming system includes a frictional element that operatively connects an input element and an output element. An actuator effects engagement of the frictional element to couple the input and output elements to transfer a torque. A control system initiates actuation of the frictional element through the actuator when a speed of the frictional element is below a priming threshold speed. The frictional element is primed to prepare the frictional element to transfer the torque from the input element to the output element, without delivering the torque to the output element. The frictional element is held in the primed state when the speed is below the priming threshold speed. The actuator completes actuation of the frictional element when the speed reaches the shift point, engaging the frictional element to deliver the torque to the output element.

In another aspect, a priming method includes a frictional element selectively coupling an input element with an output element to transfer torque. Actuation of the frictional element is initiated through an actuator when a speed of the frictional element is below a priming threshold speed. The frictional element is primed to prepare the frictional element to transfer torque from the input element to the output element, without delivering the torque to the output element. The frictional element is held in the primed state when the speed is below the priming threshold speed. Actuation of the frictional element is completed to deliver torque to the output element when the speed reaches the shift point.

In an additional aspect, a priming system includes an input element configured to rotate in response to torque that is supplied in a transmission. An output element is alternatively coupled with the input element to rotate therewith, or decoupled from the input element to not rotate therewith. The output element receives the torque when coupled with the input element. A frictional element is operatively connected between the input element and the output element. An actuator effects engagement of the frictional element to couple the input and output elements to transfer the torque to the output element, and to effect disengagement of the frictional element to decouple the input and output elements to not transfer the torque to the output element. A control system initiates actuation of the frictional element through the actuator when a speed of the frictional element is below a priming threshold speed. When the speed is below the priming threshold speed, the frictional element is primed to prepare the frictional element to transfer torque from the input element to the output element, without delivering the torque to the output element. Actuation of the frictional element is completed when the speed reaches a shift point, to engage the frictional element to deliver the torque to the output element.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of a disclosed priming system and method for frictional elements, as shown in the accompanying figures of the drawings described briefly above. Various modifications to the example embodiments may be contemplated by one of skill in the art.

In one or more example implementations of the disclosed priming system and method, frictional element engagement is provided to quickly deliver torque through the frictional element when needed, desensitizing performance of the frictional element from engagement time. Generally, the frictional element is primed to prepare for the delivery of torque when the speed of the frictional element decreases to a priming threshold speed. The priming threshold speed is defined by a preselected speed range around a shift point of the frictional element, where the frictional element shifts between engagement and disengagement as further described below. Once primed, the frictional element is prepared for engagement which is accomplished within a narrower actuation window then otherwise possible. The shorter time period is beneficial such as when operating conditions call for a shift within a shorter time period than the reaction time that a frictional element would provide without priming.

Example environments in which a priming system and method may be implemented include work vehicles and other vehicles that use a transmission with frictional elements. Example work vehicles include a loader, excavator, harvester, truck, dozer, skid steer, and other vehicles for off-road uses, including those used in the construction, agriculture, or forestry industries. Other vehicles include passenger vehicles, other on-road vehicles, recreation vehicles, tow-vehicles, and load carrying vehicles.

The following description relates to frictional elements in the context of certain transmission applications, for purposes of demonstrating examples. In transmissions, multiple frictional elements may be employed and their individual actuation requirements are determined by the architecture and operation of the transmission. The present disclosure is not limited to vehicle transmission applications, or to any particular frictional element operation regime but rather, also encompasses any application where multiple frictional elements are operated to coordinate the transmission of torque. Accordingly, the teachings of the present disclosure may be applied to frictional element systems in a variety of applications, including in vehicle transmissions, when desired.

In an example of the present disclosure as further described below, a priming system generally includes an actuator that effects engagement of a frictional element to selectively couple input and output elements to transfer a torque. The actuator initiates engagement when a speed of the frictional element is below the priming threshold speed. Initially, the frictional element is moved to a primed state to prepare the frictional element to transfer torque from the input element to the output element without actually delivering the torque to the output element in the primed state. It will be appreciated that delivering torque means that the frictional element is engaged to a state where it has a frictional torque capability that produces a controllable amount of torque in the output element including when some modulation or slip is involved, but is not inclusive of windage, spin losses or power losses that may occur separate from torque transfer. Once primed, the frictional element is held in the primed state as long as its speed is below the priming threshold speed. Complete actuation of the frictional element is effected when the speed reaches a shift point to engage the frictional element to deliver the torque to the output element. Complete actuation may involve modulation of the frictional element such as to impart a desirable shift quality.

Figure 1:
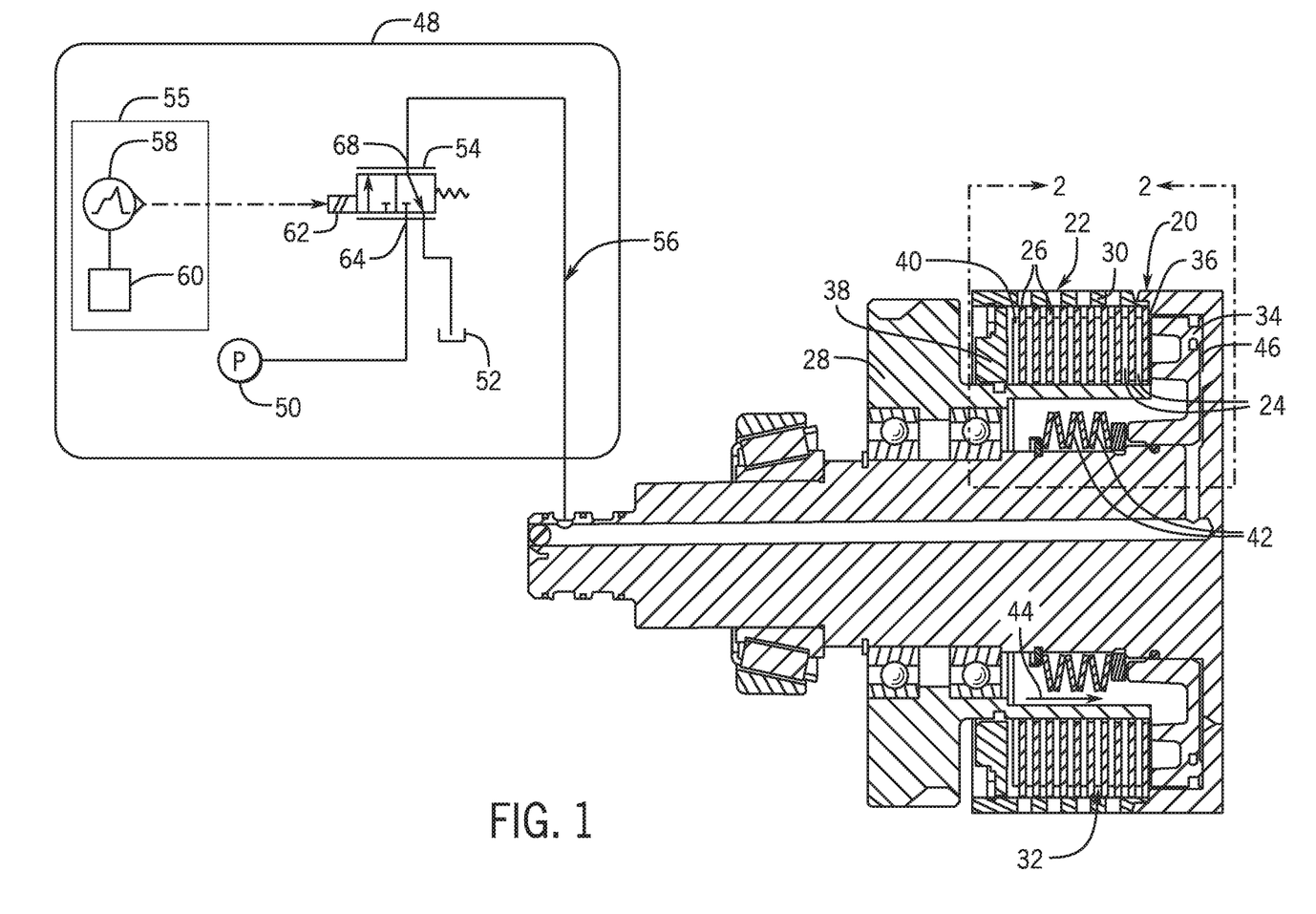
FIG. 1 is a schematic illustration of an example clutch system application.

As noted above, the priming system and method described herein may be employed in a variety of applications. Referring to FIG. 1, one example involves a transmission 20 (partially shown), which includes a frictional element which in this example is a clutch 22. The clutch 22 may be one of several frictional elements included for operation of the transmission 20 and is shown as an example for description purposes. It will be understood that the priming systems and methods described herein are applicable to frictional elements in general, and the clutch 22 is but one example thereof. For example, other types of frictional elements may be employed, including shift collars, synchronizers, one-way clutches, frictional band brakes, disc brakes, drum brakes, and others. In this example, the clutch 22 includes a series of inner plates 24 interleaved with a series of outer plates 26. The inner plates 24 and/or the outer plates 26 may include a friction material to assist in transferring torque between the inner and outer plates 24, 26 while withstanding relative rotation or slip therebetween. The inner plates 24 are carried by an input element 28 and the outer plates 26 are carried by an output element 30. While in this example element 28 provides input and element 30 provides output, in other examples the input and output functions may be reversed, or the elements 28, 30 may each provide dual input and output functions. The input element 28 and the output element 30 are configured to rotate relative to one another when the clutch 22 is disengaged and are frictionally locked to rotate together when the clutch 22 is engaged. Depending on the architecture of the transmission 20, the elements 28, 30 may be fixed to a case (not shown), may be freely rotating when the clutch 22 is disengaged, or may be coupled with other clutches or components of the transmission 20. It should also be understood that in certain embodiments, when the inner and outer plates 24, 26 are locked together a braking action may be imparted, depending on the operational state of other elements of the transmission 20 that are coupled with the inner and outer plates 24, 26. Accordingly, when the inner and outer plates 24, 26 are described as rotating together, they may specifically be static and not rotating, depending on the architecture and status of the transmission 20.

The inner plates 24 and the outer plates 26 form a clutch pack 32 that requires compression for engagement to transfer torque between the input element 28 and the output element 30. Accordingly, a piston 34 is disposed at one end 36 of the clutch pack 32 and a stop 38 is disposed at the opposite end 40 to selectively effect a compressive force. In opposition to compression of the clutch pack 32, return springs 42 force the piston 34 away from the stop 38 to separate the inner and outer plates 24, 26 as shown in FIG. 1 so that torque is not transferred. The return springs 42 apply a continuous force 44 to the piston 34 so that in this example, the clutch 22 is disengaged absent an application force sufficient to overcome the force 44 and to compress the clutch pack 32. To provide the application force in the current example the piston 34 is urged to compress the clutch pack 32 by hydraulic pressure introduced into a chamber 46. Hydraulic pressure in the chamber 46 is controlled by a control system 48.

In the example of FIG. 1, the control system 48 generally includes a pressure source which in this example is a pump 50, a reservoir 52 for system fluid, a control valve 54, and a controller 55. The pump 50 may be any of a variety of hydraulic pumps capable of supplying sufficient pressure to overcome the return springs 42 and to compress the clutch pack 32 for the torque levels for which it is intended to transfer. The control valve 54 in the current example, is a pilot operated pressure control valve configured to deliver a target pressure to the part of the hydraulic circuit 56 that includes the chamber 46. Specifically, the control valve 54 is a two-position three-way solenoid operated valve with a spring return. The controller 55 includes a processor 58 and memory 60. The processor 58 performs the computation and control functions of the controller 55, and may comprise any type of processor or multiple processors, single integrated circuits such as a microprocessor, or any suitable number of integrated circuit devices and/or circuit boards working in cooperation to accomplish the functions of a processing unit. During operation, the processor 58 executes one or more programs which may be contained within the memory 60 and, as such, controls the general operation of the controller 55 and the computer system of the controller 55 in executing the processes described herein. In the depicted embodiment, the memory 60 stores the above-referenced program(s). The computer system of the controller 55 may also otherwise differ from the embodiment depicted in FIG. 1, for example the computer system of the controller 55 may be coupled to or may otherwise utilize one or more remote computer systems and/or other control systems.

Figure 2:
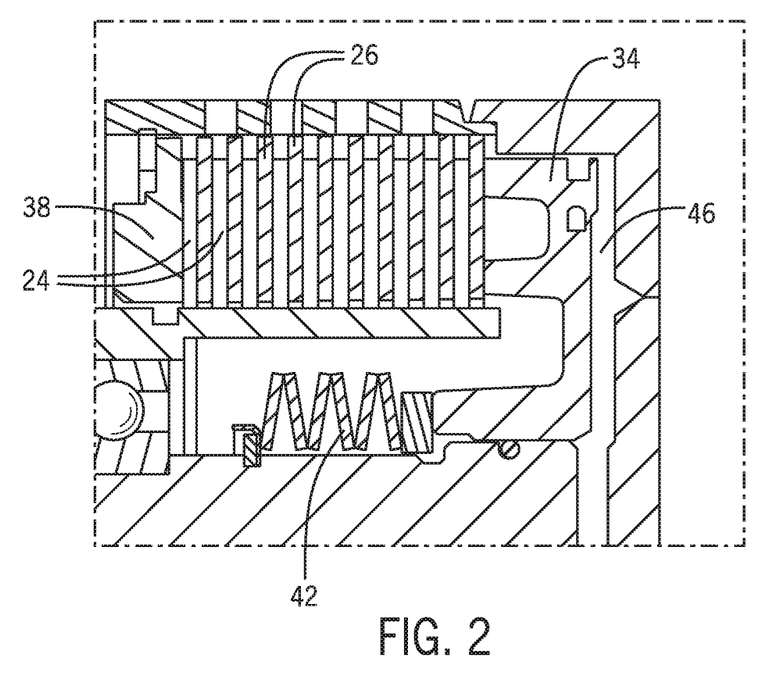
FIG. 2 is a fragmentary view of the clutch engagement element area 2-2 of the clutch system of FIG. 1 in an engaged state.

To engage the clutch 22, such as for the purpose of transferring torque between the input element 28 and the output element 30, the controller 55 delivers a command to the solenoid 62 of the control valve 54 opening the pressure port 64 to the clutch port 68 to move the piston 34 as shown in FIG. 2. As described in further detail below, the resulting pressure in the chamber 46 causes the piston 34 to compress the clutch pack 32, initially taking up slack by closing the gaps between the inner and outer plates 24, 26 and the stop 38 and, when increased further, generating frictional engagement to cause the inner and outer plates 24, 26 to rotate together to transfer torque. It will be understood that slip between the inner and outer plates 24, 26 is controllable to modulate the amount of torque transferred by modulating the pressure in the chamber 46 through operation of the control system 48. Upon full pressurization of the chamber 46, the piston 34 compresses the clutch pack 32 so that the inner and outer plates 24, 26 are engaged to locked together as shown in FIG. 2.

Figure 3:
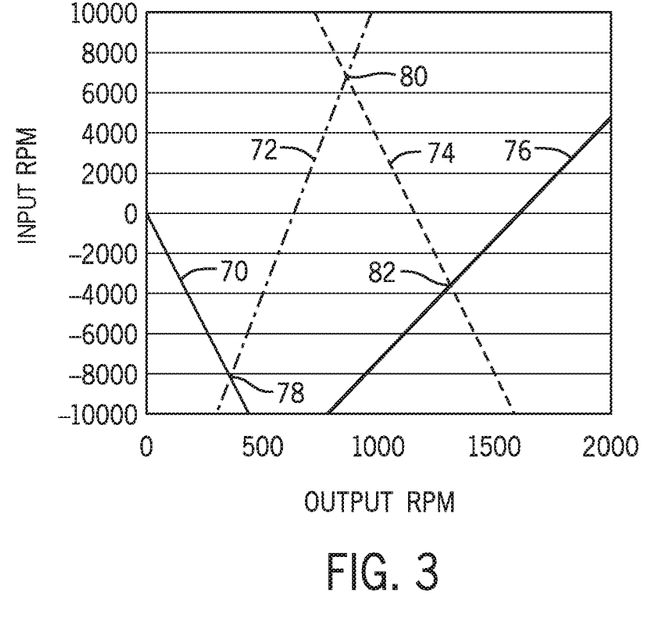
FIG. 3 is a chart of relative input and output speeds for four gear combinations of a variable transmission.
Figure 4:
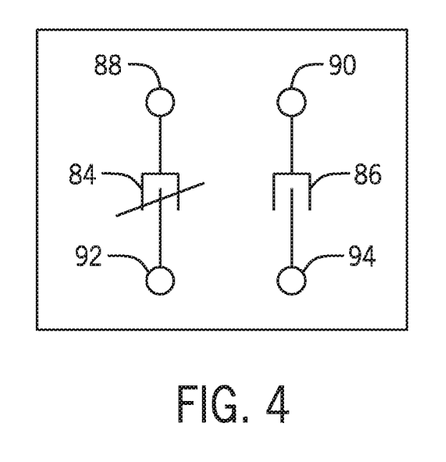
FIG. 4 is a schematic illustration of clutches in various states.

FIG. 3 depicts input speed versus output speed for four gears or modes of a transmission. The present example is described in the context of an infinitely variable transmission (IVT). As noted, the priming systems and methods described herein may be used within any known transmission architecture for on or off-highway use, and in applications with various types of power input such as internal combustion engines, hydrostatic drives, electric motors or others. Curve 70 depicts input speed in revolutions per minute (rpm), versus output speed in rpm for a first mode where the negative values on the vertical axis indicate that the input element is turning in an opposite direction from the output element. Such an outcome may, for example, arise in an IVT with a compound planetary gear set. Curve 72 represents a second mode, curve 74 represents a third mode, and curve 76 represents a fourth mode of the transmission. The points where the speeds of one mode intersect with another mode represent operating states of the transmission where the input and output speeds of the transmission, and therefore of the involved frictional elements, are equal in both modes. These intersections represent preferred transmission shift points 78, 80, 82, where one frictional element shifts from an engaged state to a disengaged state, and another frictional element shifts from a disengaged state to an engaged state. For example, as shown in FIG. 4, at the shift point 78 a clutch 84 begins in an engaged state and a clutch 86 begins in a disengaged state. The shift point 78 represents a singular output speed where the shift must occur for optimal transmission operation, and is referred to as a synchronous shift point. At this output speed, the elements of both the off-going clutch (clutch 84), and on-coming clutch (clutch 86), for the particular shift point 78 are at zero relative speed. More specifically, input elements 88 and 90 are at the same speed and output elements 92, 94 are at the same speed. This is the point at which the shift is executed to obtain the best shift quality possible. Because the clutch elements are at zero relative speed, both clutches 84, 86 may be simultaneously engaged without binding the transmission. Accordingly, the shift may be performed without degradation in shift quality given the relative speed of the input and output elements. If a shift occurs early or late relative to the shift point 78, the shift quality is degraded due to a gap between input and output rpms of the oncoming clutch 86 where input speed must immediately change to a different output speed.

Figure 5:
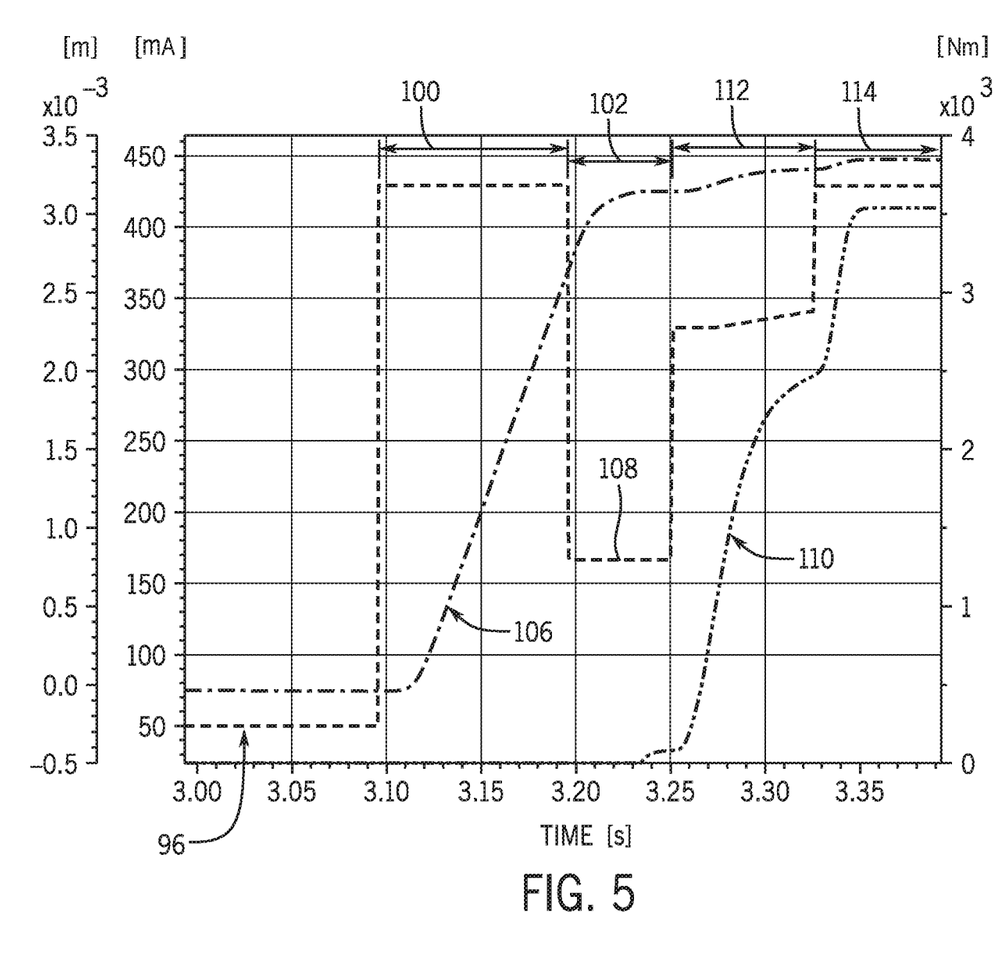
FIG. 5 is a graph of piston displacement, actuator command values, and torque capacity of a clutch each over time.
Figure 6:
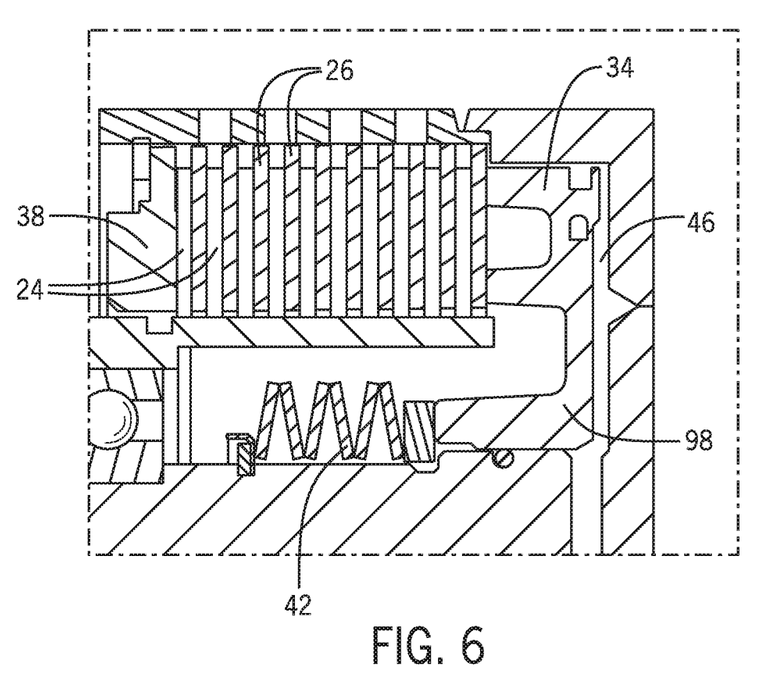
FIG. 6 is a fragmentary view of the clutch engagement element area 2-2 of the clutch system of FIG. 1 in a primed state.

In the current example, when a frictional element, such as clutch 84, slows to below a threshold speed relative to another frictional element, such as the clutch 86, it is near a synchronous shift point such as the shift point 78. More particularly, when the input elements 88, 90 are approaching the same speed and the output elements 92, 94 are approaching the same speed, such as the speeds at the shift point 78, a shift may be incipient. Accordingly, the potentially oncoming clutch, clutch 86 in this example, may be primed in preparation for engagement. Referring to FIG. 5, the control valve 54 of FIG. 1 for example, controls pressure in chamber 46 behind the piston 34. Generally, increasing the command 96 (shown in milliamps) delivered to the solenoid 62, shifts the control valve 54 opening the pressure port 64 to the clutch port 68, resulting in either increasing hydraulic oil flow or pressure, or both. As the chamber 46 is pressurized, the piston 34 begins to move off its fully returned position of FIG. 1 compressing the return springs 42. In the example of FIG. 5, the chamber 46 is pressurized to move the piston 34 to take up slack priming the clutch 22 and preparing it for engagement to a primed position 98 shown in FIG. 6. To accomplish priming, the command 96 is set to maximum for a time period 100 and then reduced to hold the primed state for a time period 102. The time period 100 may be determined through various methods, such as by using pressure feedback from the chamber 46 to accomplish a pressure that overcomes and then balances the force of the return springs 42. The time period 102 may be any amount of time determined by operation of the transmission, and may be indefinite as the clutch 22 is held in the primed state.

As shown by the piston displacement curve 106, the piston 34 quickly moves during time period 100 in response to the maximum command value, and then slows and maintains position during time period 102, in response to the primed section 108 of the command 96. Also, shown in FIG. 5, the torque capacity 110 remains at or near zero during time periods 100, 102, meaning the clutch 22 does not transfer torque between the input element 28 and the output element 30. When the shift point 78 is reached and full engagement of the clutch 22 is required, the command 96 is increased during time period 112 for a modulation phase of clutch engagement. The clutch 22 begins to produce controllable torque during the time period 112 where the solenoid command may be stepped and ramped to produce a desired shift feel. The piston 34 continues moving compressing the clutch pack 32 of the clutch 22 and at time period 114, the command 96 is increased to the maximum command to lock the clutch pack 32 in the fully engaged state of FIG. 2. The on-coming clutch begins performing torque transfer during time period 112 at the shift point 78 of FIG. 3. Therefore, the actions of time periods 100, 102 are performed prior to reaching the shift point 78. When operating conditions advance the transmission to the shift point 78 more rapidly than the time required for complete filling of the chamber 46, priming the clutch 22 through the time periods 100, 102 in advance and holding the primed state, reduces the time needed to complete engagement of the clutch 22, ensuring good shift quality. In addition, the time periods 112, 114 may involve a slower fill of the chamber 46 because the reminder of fill volume is smaller. For example, the periods 100, 102 may include a fast fill to 90% of the volume of chamber 46, and following the hold time period of the primed section 108, the remaining 10% may be filled at a slower rate. Accordingly with priming, overfill and its resulting degradation of shift quality is avoided. Similarly with priming, additional time is available to recover from underfill clutch situations. Complete clutch fill times may range from 100 milliseconds to 250 milliseconds. Utilizing the described methodology of priming based on clutch relative speed, total shift time post-priming is reduced to 30-50 milliseconds. This increases the responsiveness of the drivetrain control system and provides accuracy of selecting the appropriate gear for the operating conditions. In addition, changes in clutch wear, which may impact the overall filling volume of the clutch, are automatically compensated for with priming. This is because with the priming process, the chamber 46 will be near full when a clutch shift is needed. Therefore, a form of adaptive clutch fill logic is provided without the need for complex algorithms based on estimates.

Figure 7:
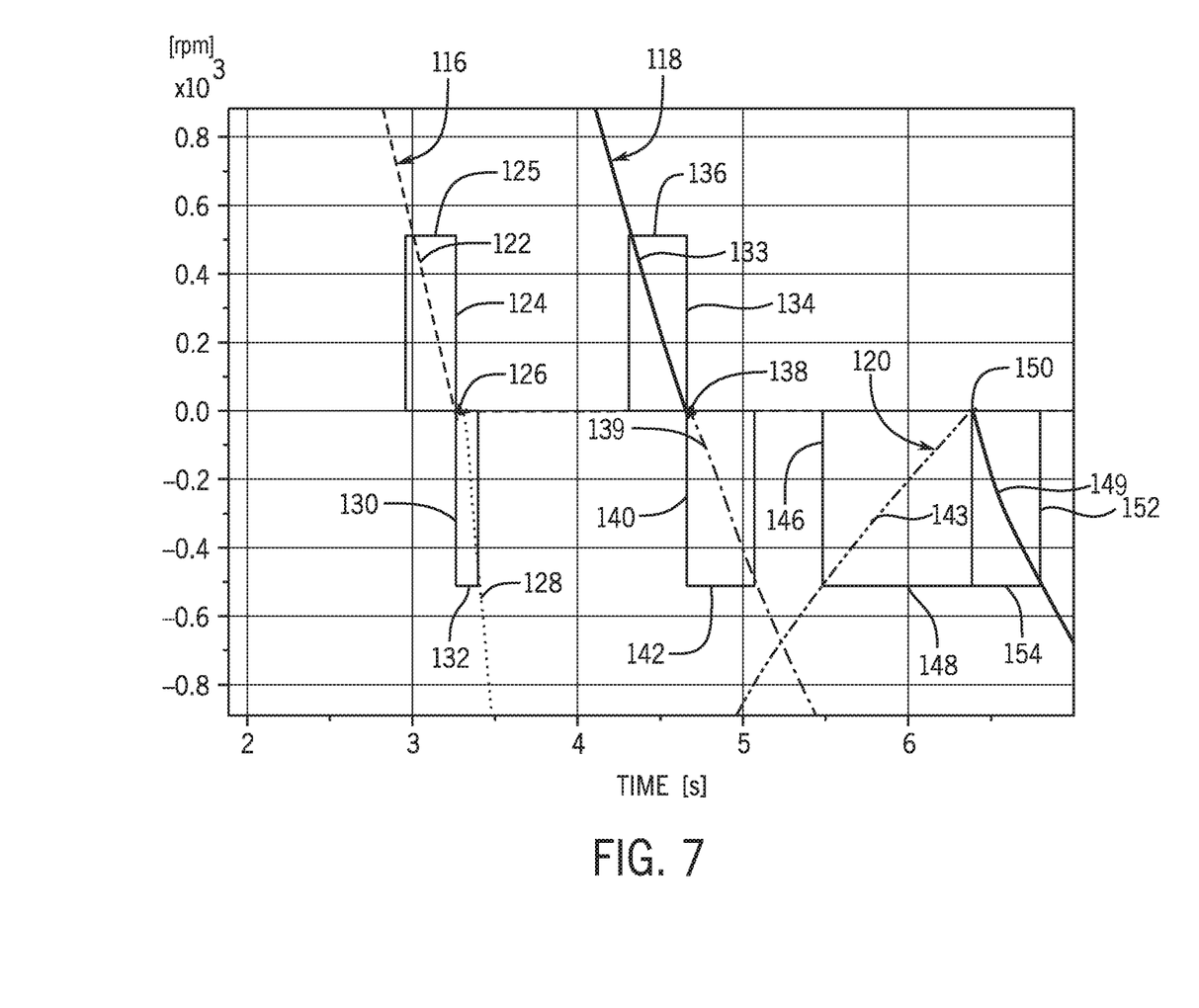
FIG. 7 is a graph of clutch relative speed (rpm) over time showing various clutch primed regions.

As described, the priming systems and methods disclosed herein prime a frictional element through time periods 100, 102 any time a particular frictional element's relative speed is below a threshold. The frictional element will remain primed through the time period 102 indefinitely as long as the transmission is operated so that the frictional element's relative speed remains below the threshold. When primed, the frictional element is always in a state of readiness should a shift be required. FIG. 7 shows the primed state regions of various clutches as frictional elements in the example IVT architecture, assuming the priming threshold of the clutches is 500 rpm. The specific threshold for a given application will be determined based on the expected operating conditions and the amount of time it takes to completely engage the clutch. The relative speeds of six clutches of an example transmission are shown by curves 116, 118, 120, which each depict a pair of clutches, one in oncoming operation and the other in off-going operation. On the vertical axis, negative values represent relative speeds that are opposite in direction between input and output. The segment 122 of curve 116 above zero indicates that the oncoming clutch has a relative speed that is decreasing as time progresses. For purposes of illustration, the oncoming clutch proceeds to zero relative speed where the oncoming clutch will shift from a disengaged state to an engaged state. The segment 122 enters a primed state of the oncoming clutch when the relative speed reaches/drops below the priming threshold speed 125 of 500 rpm. The primed state of the oncoming clutch is defined by the priming region 124 which has an area of the preselected 500 rpm by a time t, the duration of which is determined by the operating conditions of the transmission. In the current example the transmission is operated at full throttle through a series of shifts. In this example, the segment 122 of the oncoming clutch's relative speed curve 116 progresses to zero at the shift point 126. It should be understood that although the priming region 124 is entered, operating conditions may be varying and the shift point 126 may not be reached, or may be reached in a different period of time than that shown in FIG. 7. Following the state shift of the oncoming clutch depicted by segment 122 at shift point 126, the curve 116 includes a segment 128 through which the relative speed of the off-going clutch departs from zero. The off-going clutch is maintained in a primed state through the priming region 130. In the current example, the off-going clutch proceeds through the priming region 130 and its relative speed exceeds the threshold speed of 500 rpm and the primed state is exited and the off-going clutch is completely disengaged. Should operating conditions of the transmission change when the off-going clutch is in the priming region 130, it remains primed and ready to return through the shift point 126 to its opposite state. Thus, if a shift has just completed, resulting in a particular clutch shifting between engaged and disengaged, that clutch would remain in a state of prime following the shift, until it's relative speed increases beyond the priming threshold speed 132.

Curve 118 shows the relative speed of another pair of clutches of the transmission. In this case, prior to a shift, the segment 133 depicts the oncoming clutch entering priming region 134 when reaching the threshold speed 136. After the shift at shift point 138, as depicted by segment 139 the off-going clutch is in the priming region 140 until the threshold speed 142 is surpassed, or the off-going clutch returns to the shift point 138. Similarly, the Curve 120 shows the relative speed of another oncoming clutch of the transmission at segment 143. In this case, prior to a shift, the oncoming clutch enters priming region 146 when reaching the threshold speed 148. As shown by segment 149, after the shift at shift point 150, the off-going clutch is in the priming region 152 until the threshold speed 154 is surpassed, or the off-going clutch returns to the shift point 150. In this case, the oncoming clutch approaches zero from the negative side and due to the architecture of the transmission, following the shift point 150 the off-going clutch departs from zero on the negative side. In the application of FIG. 7, the transmission is operated under a torque control regime. Speed is a result of the torque target where the factors include operator input and load on transmission. When the operator presses the acceleration pedal, a torque command results and the machine within which the transmission operates will speed up at a proportional rate relative to depression. If the machine is under a heavy load, the resulting speed increase is reduced. Accordingly, an off-going clutch is in a priming region and when conditions under which the transmission is operating near one of the synchronous shift points, then the control system is ready to cross the shift point. For example, if load increases, the shift point may be re-crossed after just being crossed in the opposite direction. Priming is beneficial in torque control operation where determining whether a shift point will be crossed is more challenging than in speed control operation.

Figure 8:
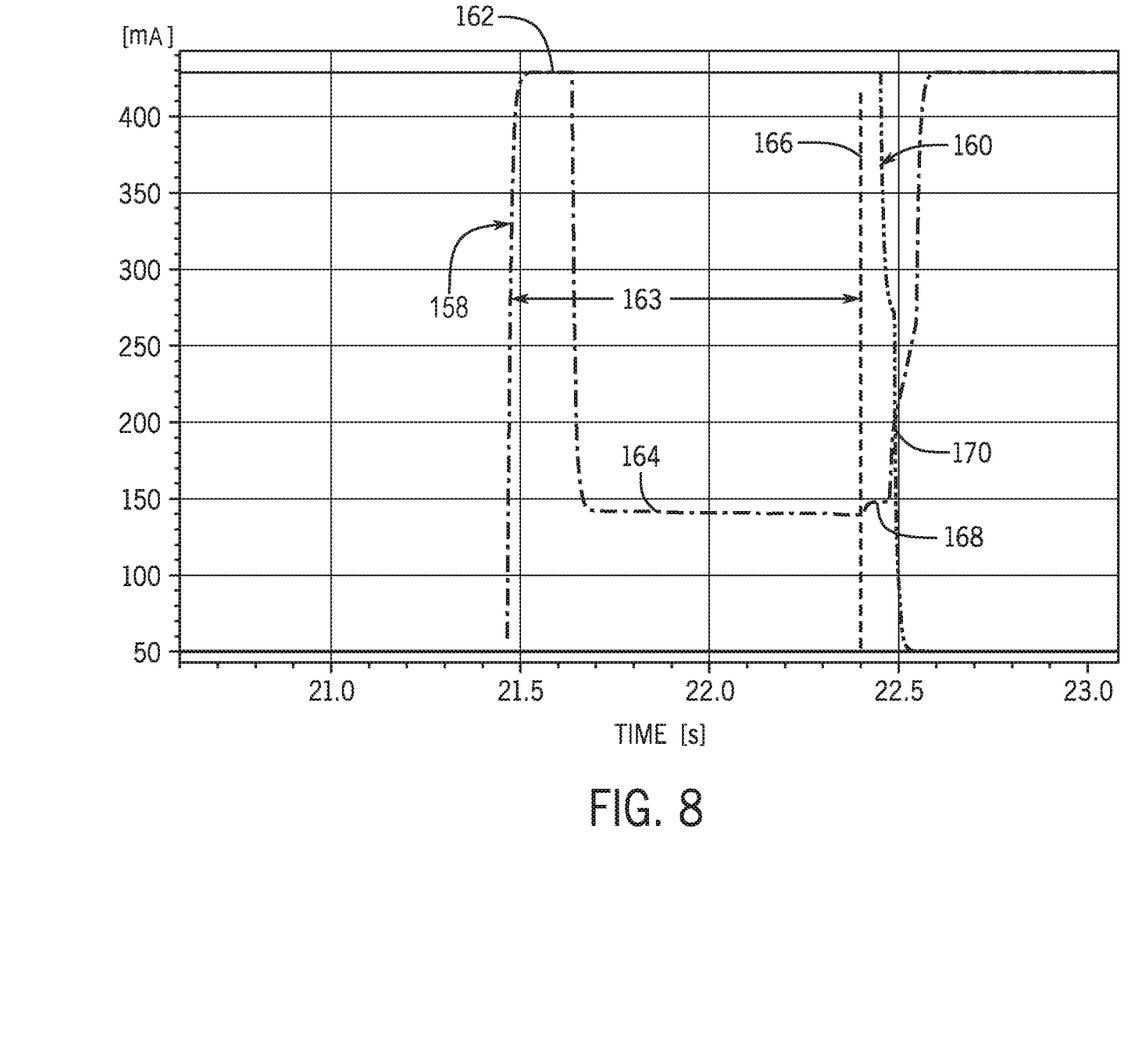
FIG. 8 is a graph of clutch actuator command values over time demonstrating pre-shift priming of an oncoming clutch.

FIG. 8 illustrates an example of priming a frictional element approaching a shift from disengaged to engaged states showing command curves in milliamps versus time. In this example the curve 158 represents the command profile for a frictional element passing through an oncoming shift from a disengaged state to an engaged state with priming. For purposes of simplifying the example, the curve 160 represents the command profile for an off-going frictional element without priming. The command of curve 158, such as that delivered to the solenoid 62 of FIG. 1, is initiated at 21.47 milliseconds and increases to a maximum command of 430 milliamps. This maximum command for example, rapidly fills the chamber 46 taking up slack in the clutch pack 32 without engaging the clutch 22 to the point of transferring controllable torque. The command pulse 162 to move the piston 34 quickly has a duration determined by the system characteristics including the size of the chamber 46 and the capacity of the pump 50. For the priming region 163, following the pulse 162 of a duration sufficient to fill the chamber 46 without engaging the clutch 22, the command is reduced to a hold level 164 holding the clutch in a primed state. At a shift request time 166, the command is increased through a modulation stage 168 and then through the clutch shift point 170 to the maximum command of 430 milliamps to lock the clutch 22. In this example, without priming, the command curve 160 moves quickly between a maximum command and zero.

Figure 9:
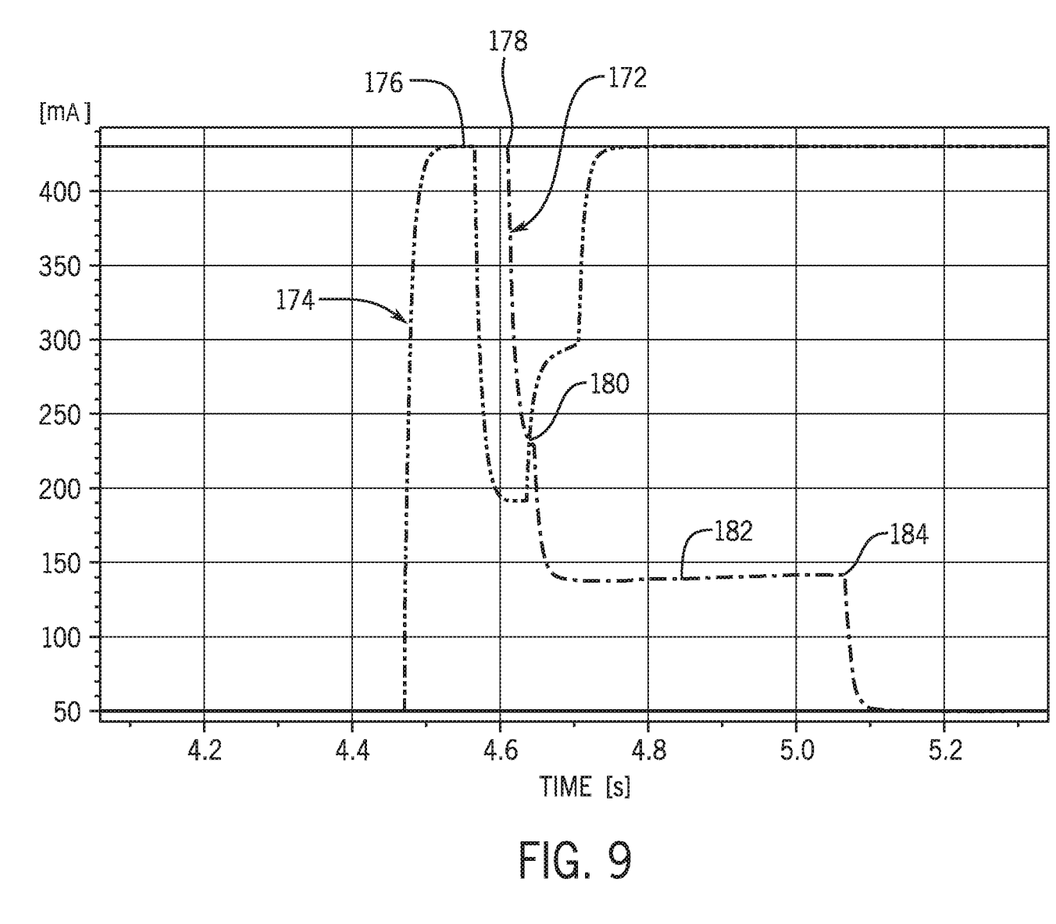
FIG. 9 is a graph of clutch actuator command values over time demonstrating post shift priming of an off-going clutch.

FIG. 9 illustrates an example of priming an off-going frictional element before a shift from engaged to disengaged states showing a command curves in milliamps versus time. In this example the curve 172 represents the command profile for a frictional element passing through an off-going shift from an engaged state to a disengaged state with priming. For purposes of simplifying the example, the curve 174 represents the command profile for an oncoming frictional element without priming. The command, such as that delivered to the solenoid 62 of FIG. 1, begins at a maximum command of 430 milliamps with the frictional element engaged. For example, this command maintains the chamber 46 in a filled condition engaging the clutch 22 to transfer controllable torque. The command to shift is initiated for the oncoming clutch at point 176 and for the off-going clutch at point 178. The curve 174 depicts the oncoming clutch being modulated and then engaged with a maximum command. The commands cross at the synchronous shift point 180. The off-going clutch is held in a primed state by the command segment 182 to hold pressure in the chamber 46 below a torque transfer level at a calibrated or feedback controlled hold value of approximately 150 milliamps. The clutch 22 is held in a primed state until the threshold speed is surpassed at point 184.

With the priming systems and methods described herein, when a shift, or an additional shift, is commanded while any given frictional element is in a state of prime, the frictional element is ready to produce torque nearly instantaneously. Priming executes below a specified frictional element relative threshold speed. This ensures any windage and spin losses are minimal. In a highly dynamic vehicle application, priming helps prevent cases of missed shifts, helps mask high shifting frequency from the operator, and generally results in more consistent operation. Additionally, since the shift logic does not have to request a shift early to complete the filling process in a short time when required, the logic may determine up to the last instant if a shift is actually required. Using priming with a short engagement fill, avoids situations where conditions change during a filling process which might otherwise negate the need to shift after a shift was commanded, but not completed.

Through the examples described above, a priming system and method initiates engagement when a speed of the frictional element is below the priming threshold speed. Initially, the frictional element is moved to a primed state to prepare the frictional element to transfer torque from the input element to the output element, without actually delivering the torque to the output element in the primed state. Once primed, the frictional element is held in the primed state as long as its speed is below the priming threshold speed. Complete actuation of the frictional element is effected when the speed reaches a shift point, to engage the frictional element to deliver the torque to the output element. Following a shift, the frictional element is held in a primed state until its speed exceeds the threshold, so that the frictional element is prepared to move through the shift point in the reverse direction if operating conditions require.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A priming system comprising:
an input element configured to rotate;
an output element alternatively coupled with the input element to rotate therewith, or decoupled from the input element to not rotate therewith;
a frictional element operatively connected between the input element and the output element;
an actuator configured to effect engagement of the frictional element to couple the input and output elements to transfer a torque, and configured to effect disengagement of the frictional element to decouple the input and output elements to not transfer the torque to the output element; and
a control system configured to:
 initiate actuation of the frictional element through the actuator when a speed of the frictional element is below a priming threshold speed, wherein the priming threshold speed is defined by a preselected speed range around a shift point of the frictional element where the frictional element shifts between engagement and disengagement;
 prime the frictional element to a primed state to prepare the frictional element to transfer the torque from the input element to the output element, without delivering the torque to the output element;
 hold the frictional element in the primed state when the speed is below the priming threshold speed; and
 complete actuation of the frictional element through the actuator when the speed reaches the shift point, to engage the frictional element to deliver the torque to the output element.

2. The system of claim 1, wherein the control system is configured to maintain the primed state when the frictional element is in an oncoming state prior to reaching the shift point, and when the frictional element is in an off-going state after passing the shift point.

3. The system of claim 1, wherein the control system is configured to:
engage the frictional element by delivering an apply pressure to the frictional element; and
modulate the apply pressure to control the torque over a modulated range where the torque delivered to the output element is varied.

4. The system of claim 1, wherein the control system is configured to hold the primed state continuously, when the speed remains below the priming threshold speed.

5. The system of claim 1, further comprising an on-coming frictional element configured to engage at the shift point;
wherein the frictional element is an off-going frictional element configured to disengage at the shift point; and
wherein the control system is configured to hold the prime pressure at both the off-going frictional element and the on-coming frictional element, simultaneously.

6. The system of claim 1, wherein the actuator is configured to respond to an electric command and the control system is configured to deliver the electric command in four stages including a first stage that effects a fast actuation of the frictional element to the primed state, a second stage that effects holding of the frictional element at the primed state, a third stage that effects a modulation of the frictional element, and a fourth stage that effects the complete actuation of the frictional element.

7. The system of claim 1, wherein, the actuator comprises a hydraulic actuator, wherein when actuating the frictional element to the primed state, the control system is configured to operate in a flow control mode to reach the prime primed state and in a pressure control mode to hold the primed state.

8. A priming method comprising:
coupling, through a frictional element, an input element with an output element to transfer a torque, or alternatively, decoupling, through the frictional element, the input element from the output element to not transfer the torque;
initiating actuation of the frictional element through an actuator when a speed of the frictional element is below a priming threshold speed, wherein the priming threshold speed is defined by a preselected speed range around a shift point of the frictional element where the frictional element shifts between coupling and decoupling of the input and output elements;
priming the frictional element to a primed state to prepare the frictional element to transfer the torque from the input element to the output element, without delivering the torque to the output element;
holding the frictional element in the primed state when the speed is below the priming threshold speed; and
completing, through the actuator, actuation of the frictional element to an engaged state of the frictional element to deliver the torque to the output element when the speed reaches the shift point.

9. The method of claim 8, comprising:
maintaining the primed state when the frictional element is in an oncoming state prior to reaching the shift point; and
maintaining the primed state when the frictional element is in an off-going state after passing the shift point.

10. The method of claim 8, comprising modulating, by the control system, an apply pressure to control the torque over a modulated range where the torque delivered to the output element is varied.

11. The method of claim 8, comprising holding, by the control system, the frictional element in the primed state continuously, when the speed remains below the priming threshold speed.

12. The method of claim 8, comprising:
configuring the frictional element to disengage at the shift point as an off-going frictional element;
configuring an oncoming frictional element to engage at the shift point; and
holding, by the control system, the off-going frictional element in the primed stated and the on-coming frictional element in the primed state, simultaneously.

13. The method of claim 8, comprising:
delivering, by the control system, a first phase electric command to the actuator that effects a fast actuation of the frictional element to the primed state;
delivering, by the control system, a second phase electric command to the actuator that holds the frictional element in the primed state;
delivering, by the control system, a third phase electric command to the actuator that modulates the frictional element; and
delivering, by the control system, a fourth phase electric command to the actuator that fully engages the frictional element to deliver the torque to the output element.

14. The method of claim 8, comprising operating the actuator hydraulically in a flow control mode to reach the primed state and in a pressure control mode to hold the frictional element in the primed state.

15. The method of claim 8, comprising:
actuating the frictional element at a first rate to reach the primed state; and
actuating the frictional element at a second rate to move from the primed state to fully engage the frictional element, wherein the second rate is slower than the first rate.

16. The method of claim 8, comprising:
urging the frictional element to disengage by applying a continuous return force to the frictional element;
holding the frictional element in the primed state by applying a prime pressure to the frictional element through the actuator; and
maintaining the primed state by balancing the prime pressure with the return force.

17. A priming method comprising:
coupling, through a frictional element, an input element with an output element to transfer a torque, or alternatively, decoupling, through the frictional element, the input element from the output element to not transfer the torque;
initiating actuation of the frictional element through an actuator when a speed of the frictional element is below a priming threshold speed, wherein the priming threshold speed is defined by a preselected speed range around a shift point of the frictional element where the frictional element shifts between coupling and decoupling of the input and output elements;
priming the frictional element to a primed state to prepare the frictional element to transfer the torque from the input element to the output element, without delivering the torque to the output element;
holding the frictional element in the primed state when the speed is below the priming threshold speed;
completing, through the actuator, actuation of the frictional element to an engaged state of the frictional element to deliver the torque to the output element when the speed reaches the shift point; and
comprising operating the frictional element in a torque control regime wherein an output speed of the output element is a function of a target torque command of the control system and of a load on the output element.

18. The method of claim 17, comprising:
maintaining the primed state when the frictional element is disengaged in an off-going state after passing the shift point; and engaging the frictional element when the load increases such that the speed of the output element returns to the shift point.

19. The method of claim 17, comprising supplying a current to the actuator wherein the current is reduced in the prime state relative to the engaged state.

20. A priming system for a transmission comprising:
   an input element configured to rotate in response to a torque that is supplied in the transmission;
   an output element alternatively coupled with the input element to rotate therewith, or decoupled from the input element to not rotate therewith, the output element configured to receive the torque when coupled with the input element;
   a frictional element operatively connected between the input element and the output element;
   an actuator configured to effect engagement of the frictional element to couple the input and output elements to transfer the torque to the output element, and configured to effect disengagement of the frictional element to decouple the input and output elements to not transfer the torque to the output element; and
   a control system configured to:
      initiate actuation of the frictional element through the actuator when a speed of the frictional element is below a priming threshold speed, wherein the priming threshold speed is defined by a preselected speed range around a shift point of the frictional element where the frictional element shifts between engagement and disengagement;
      prime the frictional element to a primed state to prepare the frictional element to transfer the torque from the input element to the output element, without delivering the torque to the output element;
      hold the frictional element in the primed state when the speed is below the priming threshold speed; and
      complete actuation of the frictional element through the actuator when the speed reaches the shift point, to engage the frictional element to deliver the torque to the output element.

* * * * *

UNITED STATES PATENT AND TRADEMARK OFFICE
CERTIFICATE OF CORRECTION

PATENT NO. : 10,655,686 B2  
APPLICATION NO. : 15/711200  
DATED : May 19, 2020  
INVENTOR(S) : Clayton G. Janasek Page 1 of 1

It is certified that error appears in the above-identified patent and that said Letters Patent is hereby corrected as shown below:

On the Title Page

In item (57), under Abstract, Column 2, Line 9, delete "in held" and insert -- is held --, therefor.

In the Claims

Column 11, Claim 7, Line 21, delete "wherein, the actuator" and insert -- wherein the actuator --, therefor.

Signed and Sealed this  
Thirteenth Day of October, 2020

Andrei Iancu  
*Director of the United States Patent and Trademark Office*